United States Patent
Shibata et al.

(10) Patent No.: US 11,040,330 B2
(45) Date of Patent: Jun. 22, 2021

(54) CHROMATOGRAPHY STATIONARY PHASE

(71) Applicant: DAICEL CORPORATION, Osaka (JP)

(72) Inventors: Toru Shibata, Himeji (JP); Satoshi Shinkura, Himeji (JP)

(73) Assignee: DAICEL CORPORATION, Osaka (JP)

( * ) Notice: Subject to any disclaimer, the term of this patent is extended or adjusted under 35 U.S.C. 154(b) by 489 days.

(21) Appl. No.: 16/087,178

(22) PCT Filed: Mar. 23, 2017

(86) PCT No.: PCT/JP2017/011655
§ 371 (c)(1),
(2) Date: Sep. 21, 2018

(87) PCT Pub. No.: WO2017/164289
PCT Pub. Date: Sep. 28, 2017

(65) Prior Publication Data
US 2019/0060871 A1 Feb. 28, 2019

(30) Foreign Application Priority Data

Mar. 23, 2016 (JP) .............................. JP2016-058225

(51) Int. Cl.
| | | |
|---|---|---|
| *B01J 20/285* | (2006.01) | |
| *B01J 20/287* | (2006.01) | |
| *B01J 20/28* | (2006.01) | |
| *B01J 20/30* | (2006.01) | |
| *B01J 20/32* | (2006.01) | |
| *G01N 30/02* | (2006.01) | |
| *B01J 20/288* | (2006.01) | |
| *B01J 20/289* | (2006.01) | |
| *B01J 20/26* | (2006.01) | |
| *G01N 30/52* | (2006.01) | |
| *B01D 15/40* | (2006.01) | |

(52) U.S. Cl.
CPC ........... *B01J 20/285* (2013.01); *B01J 20/261* (2013.01); *B01J 20/264* (2013.01); *B01J 20/28004* (2013.01); *B01J 20/287* (2013.01); *B01J 20/288* (2013.01); *B01J 20/289* (2013.01); *B01J 20/28019* (2013.01); *B01J 20/28042* (2013.01); *B01J 20/3078* (2013.01); *B01J 20/3085* (2013.01); *B01J 20/3204* (2013.01); *B01J 20/3217* (2013.01); *B01J 20/3276* (2013.01); *B01J 20/3282* (2013.01); *G01N 30/02* (2013.01); *G01N 30/52* (2013.01); *B01D 15/40* (2013.01); *B01J 2220/52* (2013.01); *B01J 2220/82* (2013.01)

(58) Field of Classification Search
None
See application file for complete search history.

(56) References Cited

U.S. PATENT DOCUMENTS

| | | |
|---|---|---|
| 5,792,331 A | 8/1998 | Srinivasan et al. |
| 2001/0014448 A1* | 8/2001 | Chappa .................. C07H 21/00 435/6.15 |
| 2013/0048853 A1 | 2/2013 | Nunoshige et al. |
| 2013/0112605 A1 | 5/2013 | Wyndham et al. |
| 2015/0182943 A1 | 7/2015 | Shibata et al. |

FOREIGN PATENT DOCUMENTS

| | | |
|---|---|---|
| JP | 2001-506364 A | 5/2001 |
| JP | 2013-539016 A | 10/2013 |
| WO | WO 2011/136329 A1 | 11/2011 |
| WO | WO 2014/017280 A1 | 1/2014 |
| WO | WO 2014/201033 A1 | 12/2014 |

OTHER PUBLICATIONS

Extended European Search Report, dated Mar. 11, 2019, for corresponding European Application No. 17770329.5.
Gorbunova et al., "New N-Allylmaleimide-Based Copolymers: Synthesis and Thermal Properties," Polymer Science, Ser. B, vol. 57, No. 4, 2015, pp. 304-312, XP055552994.
International Preliminary Report on Patentability and English translation of the Written Opinion of the International Searching Authority (Forms PCT/IB/338, PCT/IB/373, and PCT/ISA/237) for International Application No. PCT/JP2017/011655, dated Oct. 4, 2018.
Batueva et al., "Sorption Properties of Polymers Based on N-Substituted Maleimides", Journal of Applied Polymer Science, vol. 129, No. 4, 2013, pp. 1978-1983.
International Search Report for PCT/JP2017/011655 (PCT/ISA/210) dated May 16, 2017.
Köhler, "Poly(vinylpyrrolidone)-coated Silica: A Versatile, Polar Stationary Phase for HPLC", Chromatographia, vol. 21, No. 10, Oct. 1986, pp. 573-582.

(Continued)

*Primary Examiner* — Yong L Chu
(74) *Attorney, Agent, or Firm* — Birch, Stewart, Kolasch & Birch, LLP

(57) ABSTRACT

Provided is a chromatography stationary phase having an excellent molecule discriminating ability. Specifically, provided is a chromatography stationary phase including a carrier carrying a copolymer that has a pyrrolidone backbone or a piperidone backbone, and an imide backbone in a repeating unit of the main chain.

13 Claims, 3 Drawing Sheets

(56) References Cited

OTHER PUBLICATIONS

Kou et al., "Reversed phase and normal phase liquid chromatography on poly(1-vinyl-2-pyrrolidone) or poly(1-vinylimidazole) bonded silica using γ-methacryloxypropyltrimethoxysilane as coupling agent. Stationary phases 23", Fresenius' Journal of Analytical Chemistry, vol. 336, 1990, pp. 409-414.
Krasilnikov et al., "Adsorption and Chromatographic Properties of Modified Silica Sorbents for the Production of Viral Preparations", Journal of Chromatography, vol. 446, 1988, pp. 211-219.
West et al., "Orthogonal screening system of columns for supercritical fluid chromatography", Journal of Chromatography A, vol. 1203, 2008, pp. 105-113.

\* cited by examiner

CHROMATOGRAPHY STATIONARY PHASE

TECHNICAL FIELD

The present invention relates to a stationary phase for chromatography. More Particularly, the present invention relates to a stationary phase used for liquid chromatography or supercritical fluid chromatography.

BACKGROUND ART

Chromatography is the most effective means for analyzing components of a mixture and amounts thereof and for separation and purification of the mixture. Specifically, different substances are separated by using a distribution ratio specific to a substance (also understood as adsorption equilibrium) between a porous solid material (stationary phase) spatially fixed in a tube called a column or a capillary and a fluid (mobile phase) moving through the gaps in the solid material. Representative examples thereof include gas chromatography and liquid chromatography. The former uses gas as the mobile phase.

However, a vapor pressure higher than a certain value is needed for the object to be separated to move in the gas phase. As a result, gas chromatography can be applied only to relatively limited number of analytes which have a low molecular weight and bear no electric charge. Meanwhile, liquid chromatography uses liquid as the mobile phase and can be applied to most substances by choosing an appropriate mobile phase.

Apart from liquid chromatography, supercritical fluid chromatography (SFC) is a method for analyzing the components of a mixture and amounts thereof and for separation and purification. This method uses a specific feature that fluids in a supercritical or subcritical state dissolve other compounds much better than gases and have lower viscosity and higher diffusion rate than liquids. SFC using carbon dioxide as a supercritical fluid has been generally used for reasons relating to safety and equipment, and the usage thereof is gradually expanding.

Normal-phase chromatography using a combination of a stationary phase with high polarity and a mobile phase with low polarity and reversed-phase chromatography with reversed polarity are representative modes of liquid chromatography. Recently, HILIC, in which both phases are polar, is attracting attention as well.

By contrast, supercritical fluid chromatography (SFC) is said to have characteristics similar to normal-phase chromatography. However, features and mechanisms thereof are still not well understood. Further, according to another approach, objects to be separated separation in a wide range of polarity can be covered by making a gradual transition from a supercritical or subcritical carbon dioxide-based mobile phase to a mobile phase with stronger polarity, that is, to a reversed-phase system.

An example of utilizing polyvinylpyrrolidone as a stationary phase for liquid chromatography is known.

Specifically, there is an example in which particles of poly(1-vinyl-2-pyrrolidone) (PVP) which have been made insoluble in a solvent by crosslinking are packed in a column and used as a stationary phase (for example, Non-Patent Document 1).

An attempt has also been made to bond PVP to the surface of silica gel which is a hard gel. For example, when silica gel is used as a stationary phase in separation of proteins or microorganisms, the property of the object substance may be changed due to so-called denaturation or the recovery rate may be remarkably lowered. Accordingly, the intention is to coat the surface with a hydrophilic polymer and shield the influence of silica gel to prevent the aforementioned effects (Non-Patent Document 2).

Several attempts have also been made to bond PVP. For example, an attempt to coat PVP on silica gel and then induce crosslinking by γ-rays has been reported (Non-Patent Document 1). Another report discloses a method in which a silane coupling agent having a vinyl group or a methacryloxy group is bonded to silica gel and then a vinyl pyrrolidone monomer is copolymerized therewith (Non-Patent Document 3). However, these methods are not widely used in liquid chromatography such as HPLC because the peak is generally broad.

Silica gel or silica gel which is surface-modified with various atomic groups is available as a stationary phase used for SFC, as disclosed, for example, in Non-Patent Document 4.

The modifying group is exemplified by groups including saturated alkyl chains of various chain lengths; groups in which one or two benzene rings and condensed polycyclic aromatic hydrocarbon groups are linked with an alkyl chain or an alkyl chain including an amide bond or an ether bond; groups featuring a halogen-substituted benzene ring; groups in which a halogenated alkyl group is linked; groups in which a polar group such as a 2,3-dihydroxypropyl group, a CN group, and an $NH_2$ group is linked; and crosslinked polystyrene, polyvinyl alcohol, polyethylene glycol and the like as polymer modifying groups. Carbon having a graphite structure is also a stationary phase having specific features. Among the abovementioned stationary phases, those in which a (2-pyridyl)ethyl group, called 2-ethylpyridine, is bonded are particularly commonly used in SFC. These are advantageously used because even basic compounds giving a broad peak due to tailing with the usual stationary phase are eluted with a sharp peak and also because acidic compounds can be appropriately retained.

However, as pointed out in Non-Patent Document 3, there are not few stationary phases showing similar retention trends and having no difference in features with respect to various compounds.

Most of the stationary phases which have been heretofore used for SFC include silica gel or silica gel which is surface-modified with various low-molecular-weight compounds. Meanwhile, stationary phases in which silica gel surface is modified with a polymer have also been reported. For example, in Patent Document 1, a polymer having an aromatic ring and a dipolar atomic group in a repeating unit of a main chain is used as a stationary phase, and such a polymer is not only effective for separation of various compounds but also has good molecular shape recognition property. However, a problem associated therewith is that unlike the 2-ethylpyridine column described above, tailing occurs and a broad peak is obtained at the time of analysis of basic substances.

Further, these stationary phases are prepared by supporting the polymer on a particulate or monolithic support. Therefore, when a solvent intrinsically capable of dissolving the polymer or a mixed solvent including such is used as a developing solvent, the entire polymer or part thereof can be dissolved thereby impairing the function of a column.

CITATION LIST

Patent Document

[Patent Document 1] Japanese Patent Application No. 2012-162518

Non Patent Document

[Non-Patent Document 1] Kohler, Chromatographia, 21 (1986) 573

[Non-Patent Document 2] I. Krasilnikov et al., J. Chromatogr., 446 (1988) 211

[Non-Patent Document 3] C. R. Kou et al., Fresenius J. Anal. Chem., 336 (1990) 409

[Non-Patent Document 4] C. West et al., J. Chromatogr. A, 1203 (2008) 105

SUMMARY OF INVENTION

Problems to be Solved by the Invention

It is an object of the present invention to solve the above problems and to provide a stationary phase for chromatography having good molecular discrimination ability.

Solution to Problem

As a result of extensive research aimed at the solution of above-mentioned problems, the inventors of the present invention have found that a stationary phase constituted by a support supporting a polymer having a pyrrolidone skeleton or a piperidone skeleton and an imide skeleton in a repeating unit of a main chain demonstrates good molecular discrimination ability in chromatography. This finding led to the completion of the present invention.

The present invention is disclosed hereinbelow.

[1] A stationary phase for chromatography, the stationary phase comprising a support supporting a polymer including a pyrrolidone skeleton or a piperidone skeleton and an imide skeleton in a repeating unit of a main chain.

[2] The stationary phase for chromatography according to [1], which has a structure represented by a following formula (III-1) or a following formula (III-2).

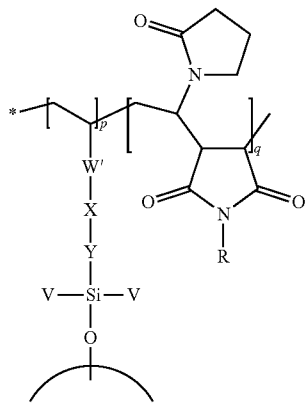

(III-1)

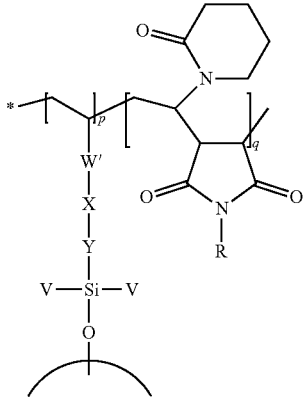

(III-2)

(In the formula III-1 or III-2, W' is a single bond or an alkylene group having 1 to 10 carbon atoms which may have a branched chain, X is an amide group, an ester group, an N-alkylamide group having 1 to 3 carbon atoms, an ether group, a sulfoxide group, a sulfone group, a sulfide group, an arylene group having 6 to 20 carbon atoms or a phosphoric acid ester group, Y is an alkylene group having 1 to 30 carbon atoms, and V is an ether group, an alkoxy group having 1 to 5 carbon atoms, or an alkyl group having 1 to 3 carbon atoms which is bonded to a support surface, p is 1 to 10, q is 10 to 1500, R is a group selected from hydrogen, an alkyl group having 1 to 6 carbon atoms, a cycloalkyl group having 3 to 12 carbon atoms, a phenyl group and a hydroxyphenyl group.)

[3] The stationary phase for chromatography according to [1] or [2], which is in the form of spherical particles.

[4] The stationary phase for chromatography according to any one of [1] to [3], which has an average particle diameter of 0.1 μm to 1000 μm.

The stationary phase for chromatography according to any one of [1] to [3], which is monolithic.

[6] The stationary phase for chromatography according to any one of [1] to [5], which is a stationary phase for supercritical fluid chromatography.

[7] A method for separating a target substance, the method comprising a step of separating the target substance by using the stationary phase according to any one of [1] to [5], and a mobile phase including an eluent or a supercritical fluid.

[8] A method for producing a stationary phase for chromatography, the method comprising a step of copolymerizing 1-vinyl-2-pyrrolidone or 1-vinyl-2-piperidone and a compound represented by a following formula (I) with a support to which a polymerizable functional group is bonded.

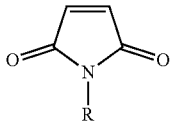

(I)

(In the formula, R is a group selected from hydrogen, an alkyl group having 1 to 6 carbon atoms, a cycloalkyl group having 3 to 12 carbon atoms, a phenyl group and a hydroxyphenyl group.)

[9] The method for producing a stationary phase for chromatography according to [8], wherein the polymerizable functional group is a vinyl group, an allyl group, an isopropenyl group or an alkenyl group having 4 to 12 carbon atoms and having a double bond at an ω position.

[10] The method for producing a stationary phase for chromatography according to [8] or [9], wherein the support to which the polymerizable functional group is bonded is a surface-modified silica gel obtained by silane coupling a compound represented by a following formula (II) with silica gel.

$$W-Y-SiR_{3-n}Z_n \quad (II)$$

(In the formula (II), W is a vinyl group, an allyl group, an isopropenyl group or an alkenyl group having 4 to 12 carbon atoms and having a double bond at an ω position, X is an amide group, an ester group, an N-alkylamide group having 1 to 3 carbon atoms, an ether group, a sulfoxide group, a sulfone group, a sulfide group, an arylene group having 6 to 20 carbon atoms or a phosphoric acid ester group, Y is an alkylene group having 1 to 30 carbon atoms, Z is an alkylene group having 1 to 30 carbon atoms, R are each independently an alkyl group having 1 to 5 carbon atoms, Z is a leaving group capable of forming a bond between the silicon atom in the formula (I) and the support, and n is an integer of 1 to 3.)

[11] The method for producing a stationary phase for chromatography according to [10], wherein W is a vinyl group, X is an amide group or an N-alkylamide group having 1 to 3 carbon atoms, Y is an alkylene group having 1 to 5 carbon atoms, R are independently a methyl group, an ethyl group, or a propyl group, and Z is an alkoxy group having 1 to 5 carbon atoms, a halogen, an alkylmercaptyl group having 1 to 20 carbon atoms, a dimethylamino group, a diethylamino group, a pyrrolidino group, an imidazolyl group, an allyl group or a 2-methyl-2-propenyl group.

[12] A method for producing a stationary phase for chromatography, the method comprising: a step of obtaining a polymer by radically polymerizing 1-vinyl-2-pyrrolidone or 1-vinyl-2-piperidone and a compound represented by a formula (I) in the presence of a chain transfer agent having a terminal reactive silyl group; and a step of silane coupling the obtained polymer with a surface of a support.

(In the formula, R is a group selected from hydrogen, an alkyl group having 1 to 6 carbon atoms, a cycloalkyl group having 3 to 12 carbon atoms, a phenyl group and a hydroxyphenyl group.)

[13] The method for producing a stationary phase for chromatography according to [12], wherein the chain transfer agent having a terminal reactive silyl group is a compound represented by a following formula (IV).

$$R_{3-n}Z_nSi-Y-T \quad (IV)$$

(In the formula (IV), R are each independently an alkyl group having 1 to 5 carbon atoms, Z is a leaving group capable of forming a bond between the silicon atom in the formula (IV) and the support, Y is an alkylene group having 1 to 30 carbon atoms, T is a chain transfer functional group, and n is an integer of 1 to 3.)

[14] The production method according to any one of [8] to [13], wherein the stationary phase for chromatography is a stationary phase for supercritical fluid chromatography.

Advantageous Effects of Invention

According to the present invention, it is possible to provide a stationary phase for chromatography having good molecular discrimination ability.

DESCRIPTION OF EMBODIMENTS

Figure 1:
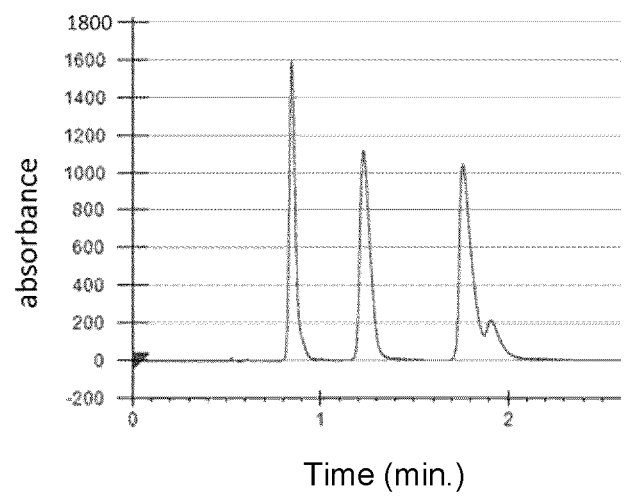
FIG. 1 is a chromatogram obtained by separating caffeine, theophylline, theobromine, and paraxanthin by SFC using the stationary phase of Example 1.

The stationary phase for chromatography of the present invention includes a support supporting a copolymer including a pyrrolidone skeleton or a piperidone skeleton and an imide skeleton in a repeating unit of a main chain.

In the present invention, the stationary phase means a material that is immobilized inside an analytical tool (column or capillary) and differentially partitions a substance to be separated between itself and a fluid moving while in contact with the stationary phase to perform separation in a chromatographic method. When the stationary phase is a particle, it may refer to an aggregate formed by packing the particles or may refer to an individual particle.

A feature of having a pyrrolidone skeleton or a piperidone skeleton and an imide skeleton in a repeating unit of a main chain means that the pyrrolidone skeleton or the piperidone skeleton and the imide skeleton represented by the following formulas are bonded in the main chain of the copolymer molecule. In the present invention, from the viewpoint of ensuring performance as a stationary phase, it is preferable that the proportion of units of the pyrrolidone skeleton or the piperidone skeleton in the copolymer molecule be 10 mol % to 90 mol % and the proportion of the imide skeleton be 90 mol % to 10 mol %, and it is more preferable that the proportion of the units of the pyrrolidone skeleton or the piperidone skeleton be 20 mol % to 80 mol % and the proportion of the units of the imide skeleton be 80 mol % to 20 mol %.

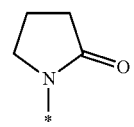

(In the formula, the asterisk indicates the position of bonding to the main chain of the copolymer.)

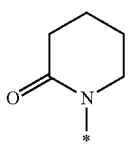

(In the formula, the asterisk indicates the position of bonding to the main chain of the copolymer.)

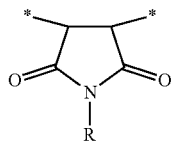

(In the formula, R is a group selected from hydrogen, an alkyl group having 1 to 6 carbon atoms, a cycloalkyl group having 3 to 12 carbon atoms, a phenyl group and a hydroxyphenyl group, and asterisks indicate the positions of bonding to the main chain of the copolymer. There are two stereochemical forms, cis form and trans form, which are bonded to the imide skeleton, but none of them is limiting.)

The imide skeleton is preferably derived from a maleimide compound represented by a following formula (I).

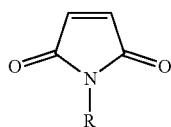

(I)

(In the formula, R is a group selected from hydrogen, an alkyl group having 1 to 6 carbon atoms, a cycloalkyl group having 3 to 12 carbon atoms, a phenyl group and a hydroxyphenyl group.)

In the formula (I), R is preferably hydrogen, a cyclohexyl group, or a phenyl group.

From the standpoint of stability and separation performance, it is preferable that in the stationary phase of the present invention, a copolymer be supported on a support, and in a more preferable embodiment, a chemical bond is formed between the support and the copolymer. Specifically, for example, the following production method can be used.

Among the following production methods, the production methods (1) to (7) generate a chemical bond (covalent bond) between the copolymer and the support. Meanwhile, in the production methods (8) and (9), since the polymers are present in a state of crosslinking with each other on the surface of the support, the copolymer is not eluted from the surface of the support.

In the stationary phase for supercritical fluid chromatography, it is possible to coat the copolymer by using a physical bond with the support, but in such a case, the copolymer may be eluted by the solvent. Therefore, this is not a preferred method.

(1) A production method including a step of radical copolymerizing 1-vinyl-2-pyrrolidone or 1-vinyl-2-piperidone with a compound represented by the formula (I) and a support to which a polymerizable functional group is bonded.

(2) A production method including a step of obtaining a polymer by radically polymerizing 1-vinyl-2-pyrrolidone or 1-vinyl-2-piperidone and a compound represented by the formula (I) in the presence of a chain transfer agent having a terminal reactive silyl group, and a step of silane coupling the obtained polymer with the surface of a support.

(3) A production method including a step of introducing a covalent bond to be a dormant species onto the surface of a support and performing living radical polymerization from the surface of the support by using 1-vinyl-2-pyrrolidone or 1-vinyl-2-piperidone and a compound represented by the formula (I), thereby introducing a polymer including a pyrrolidone skeleton or piperidone skeleton and an imide skeleton in the repeating unit of the main chain onto the surface of the support.

(4) A production method including a step of copolymerizing a silane coupling agent having a polymerizable double bond and 1-vinyl-2-pyrrolidone or 1-vinyl-2-piperidone with a compound represented by the formula (I), and a step of silane coupling the copolymer onto the surface of the support.

(5) A production method including a step of introducing a chain transfer functional group onto the surface of a support and radical polymerizing 1-vinyl-2-pyrrolidone or 1-vinyl-2-piperidone and a compound represented by the formula (I).

(6) A production method including a step of obtaining a copolymer by anion polymerizing an anionic initiator having a reactive silyl group at a starting terminal, 1-vinyl-2-pyrrolidone or 1-vinyl-2-piperidone and a compound represented by the formula (I), and a step of silane coupling the obtained copolymer with the surface of the support.

(7) A production method including a step of obtaining a copolymer by anion polymerizing an anionic initiator, 1-vinyl-2-pyrrolidone or 1-vinyl-2-piperidone and a compound represented by the formula (I) and then reacting with a terminator having a reactive silyl group, and a step of silane coupling the resulting copolymer with the surface of the support.

(8) A production method including a step of mixing a composition including 1-vinyl-2-pyrrolidone or 1-vinyl-2-piperidone, a compound represented by the formula (I), a crosslinking agent, and an initiator with a support, and a step of inducing a crosslinking reaction.

(9) A production method including a step of coating the surface of a support with a copolymer obtained by copolymerizing 1-vinyl-2-pyrrolidone or 1-vinyl-2-piperidone with a compound represented by the formula (I) and inducing a crosslinking reaction by irradiation with γ-rays or electron beam.

In either method, it is also possible to control the stereoregularity of the formed copolymer by polymerization temperature during polymerization, polymerization solvent, additives and the like.

The production method (1) will be described hereinbelow.

The support to which a polymerizable functional group is bonded and which is used in the method (1) for producing the stationary phase of the present invention can be prepared by the following method.

The polymerizable functional group bonded to the support can be exemplified by a radically polymerizable functional group, and examples thereof include a vinyl group, an allyl group, an isopropenyl group, and an alkenyl group having 4 to 12 carbon atoms and having a double bond at a ω position. Among them, a vinyl group, an allyl group and isopropenyl group are preferable.

The support can be exemplified by a porous organic support or a porous inorganic support, and a porous inorganic support is preferable. Suitable porous organic supports are polymeric substances selected from polystyrene, poly (meth)acrylamide, poly(meth)acrylate, and the like. Suitable porous inorganic supports are silica gel, alumina, zirconia, titania, magnesia, glass, kaolin, titanium oxide, silicates, hydroxyapatites and the like. Preferred supports are silica gel, alumina, and glass.

Further, recently developed packed particles for chromatography use a support in which only the surface layer is porous, this support being called a core shell or a peripheral, and such particles provide for high column efficiency. These supports can also be used in the present invention, and a core-shell type or peripheral type support using the above-mentioned materials may be used.

In the case of using a porous organic support, the polymerizable functional group can be chemically bonded to the support by a copolymerization method with a known cross-linking agent or by crosslinking by X-rays, γ-rays, or electron beam.

When silica gel is used as the support, there can be mentioned an embodiment in which the polymerizable functional group is chemically bonded to the support via a silanol group possessed by the silica gel.

In the case of using a support other than silica gel, it is possible to suppress the excessive adsorption of the substance to be separated to the support itself by surface treatment of the support, and the polymerizable functional group can be bonded via a group introduced by the surface treatment. The surface treatment agent can be exemplified by a silane coupling agent such as aminopropylsilane and a titanate-aluminate coupling agent.

The support to which the polymerizable functional group is bonded, such as described hereinabove, can be obtained by, for example, silane coupling of a compound represented by a following formula (II) and silica gel when silica gel is used as a support.

$$W—X—Y—SiR_{3-n}Z_n \quad (II)$$

(In the formula (II), W is a vinyl group, an allyl group, an isopropenyl group or an alkenyl group having 4 to 12 carbon atoms and having a double bond at an ω position, X is an amide group, an ester group, an N-alkylamide group having 1 to 3 carbon atoms, an ether group, a sulfoxide group, a sulfone group, a sulfide group, an arylene group having 6 to 20 carbon atoms or a phosphoric acid ester group, Y is an alkylene group having 1 to 30 carbon atoms, R are each independently an alkyl group having 1 to 3 carbon atoms, Z is a leaving group capable of forming a bond between the silicon atom in the formula (II) and the support, and n is an integer of 1 to 3.)

In the formula (II), W is preferably a vinyl group, an allyl group, or an isopropenyl group.

In the formula (II), X is a part of a linker between W and the terminal Z group, and is preferably an amide group, an N-alkylamide group having 1 to 3 carbon atoms, an ester group, or a phenylene group.

Y in the formula (II) is preferably an alkylene having 1 to 5 carbon atoms, and more preferably it is any one of a methylene group, an ethylene group, and a trimethylene group.

R in the formula (II) is preferably a methyl group or an ethyl group.

In the formula (II), when X is an "amide group", embodiments with —N—CO—Y and —CO—N—Y are included, and when X is an "N-alkylamide group", embodiments with —NR—CO—Y, and —CO—NR—Y are included.

In the formula (II), an embodiment in which W is a vinyl group and X is an amide group or an N-alkyl amide group and an embodiment in which W is an isopropenyl group and X is an amide group or an N-alkylamide group are preferable from the viewpoint of facilitating synthesis and obtaining a good peak shape when the object to be separated is a basic substance.

When X in the formula (II) is an "amide group", an embodiment in which Y is bonded to nitrogen in the structure of —CO—NH— is preferable, and when X is an "N-alkylamide group", an embodiment in which Y is bonded to nitrogen in the structure of —CO—NR— (R is an alkyl group having 1 to 3 carbon atoms) is preferable.

Z in the formula (II) is a leaving group and may be any atomic group as long as it can create a bond between the silicon atom in the formula (II) and an atom such as oxygen constituting the support. Groups that are commonly used because of good balance of handleability and reactivity can be exemplified by alkoxy groups having 1 to 5 carbon atoms, and among them a methoxy group and an ethoxy group are particularly preferable, halogens (chlorine, bromine, and iodine), an alkylmercaptyl group having 1 to 20 carbon atoms, nitrogen-containing groups such as a dimethylamino group, a diethylamino group, a pyrrolidino group, and an imidazolyl group, an allyl group, and a 2-methyl-2-propenyl group. Reaction conditions (including catalyst addition) can be adjusted depending on the type of the leaving group.

The compound represented by the formula (II) can be obtained by reacting a compound having a structure represented by W in the formula (II) with a compound having a structure of —Y—SiR$_{3-n}$Z$_n$ of the formula (II).

The reaction between these compounds generates "—X—" of the formula (II).

The compound having a structure represented by W can be exemplified by an α-alkylacrylic acid in which the hydrogen bonded to the 1-position of the vinyl group may be substituted with an alkyl group having 1 to 12 carbon atoms, and a halide of an α-alkylacrylic acid in which the hydrogen bonded to the 1-position of the vinyl group may be substituted with an alkyl group having 1 to 12 carbon atoms.

The compound having a structure of —Y—SiR$_{3-n}$Z$_n$ of the formula (II) can be exemplified by a silane coupling agent having a group which is a precursor of X described above and also having an alkoxy group of 1 to 5 carbon atoms as a leaving group. Specific examples include aminoalkylalkoxysilanes and hydroxyalkylalkoxysilanes.

The support to which the polymerizable functional group is bonded and which is used in the present invention is preferably a surface-modified silica gel obtained by silane coupling the compound represented by the formula (II) and silica gel.

Apart from using the compound represented by the formula (II), it is also possible to perform initially coupling of a compound having a structure of —Y—SiR$_{3-n}$Z$_n$ of the formula (II) (for example, an aminoalkylalkoxysilane or a hydroxyalkylalkoxysilane) with silica gel as a support, and then induce a reaction using a compound having a structure represented by W (for example, an α-alkylacrylic acid in which the hydrogen of carbon bonded to the vinyl group may be substituted with an alkyl group).

When the stationary phase of the present invention is produced by the above-described production method (1), the stationary phase is obtained by copolymerization of 1-vinyl-2-pyrrolidone or 1-vinyl-2-piperidone, a compound represented by the formula (I), and a support to which a polymerizable functional group is bonded.

The copolymerization can be implemented by copolymerizing all of the vinyl group of 1-vinyl-2-pyrrolidone or 1-vinyl-2-piperidone, the double bond of the compound represented by the formula (I), and the polymerizable functional group. The reaction conditions of a known reaction method can be used for such copolymerization.

It is assumed that the stationary phase of the present invention obtained by using the above-described raw materials and production method has the following structure.

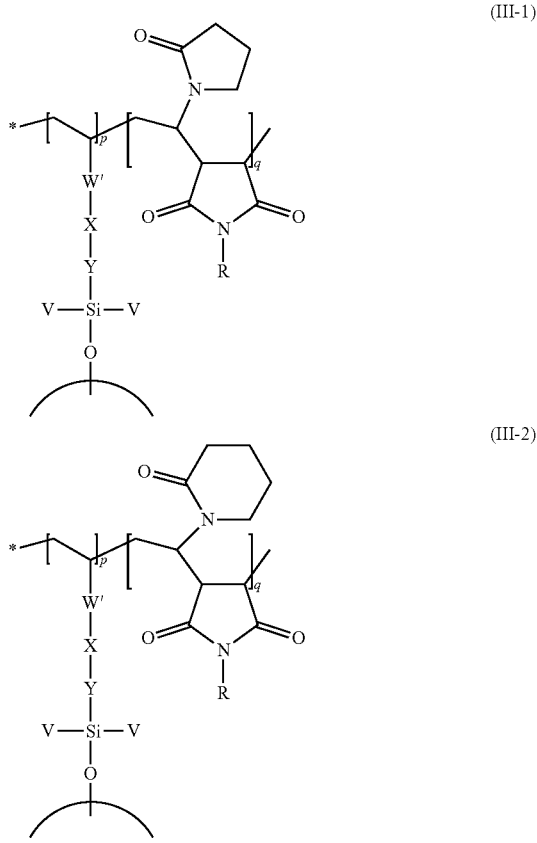

(In the formula III-1 or III-2, W' is a group derived from W of the formula (II) and formed by addition polymerization, X is an amide group, an ester group, an N-alkylamide group having 1 to 3 carbon atoms, an ether group, a sulfoxide group, a sulfone group, a sulfide group, a phenylene group, or a phosphoric acid ester group, Y is an alkylene group having 1 to 30 carbon atoms, and V is an ether group bonded to the surface of the support, or an unreacted Z group or R group in the formula (II). The pyrrolidone skeleton and the imide skeleton do not necessarily exist alternately in the formula III-1. The piperidine skeleton and the imide skeleton do not necessarily exist alternately in the formula III-2.)

Specific examples of W' in the formula (III-1) or (III-2) include a single bond and an alkylene group which has 1 to 10 carbon atoms and which may have a branched chain. Preferable examples thereof include a single bond, a methylene group, an ethylene group, and a trimethylene group.

Preferred groups of X and Y in the formula (III-1) or (III-2) can be the same as those in the formula (II).

In the formula (III-1) or (III-2), p may be 1 or more, and q may be about 10 to 1500. p is preferably 1 to 10, and q is preferably 15 to 1100, more preferably 20 to 1000. When p and q are both 2 or more, in the formula (III-1) or (III-2), it appears that a block copolymer is formed in which a unit having a pyrrolidone skeleton or a piperidone skeleton, a unit having an imide skeleton, and a unit having a bond with a support are sequential, but the formula (III-1) or (III-2) represents only the number of each residue, and it is presumed that the copolymer is actually a random copolymer with high degree of alternation.

Regarding V in the formula (III-1) or (III-2), in the compound represented by the formula (II), when $n=1$, $V=R$. When $n=2$, the proportion of the R group is 50% with respect to the total number of V, and the unreacted Z group or the structure in which the Z group is substituted by a reaction on the surface of a support take 0% to 50% and 50% to 0%, respectively. When $n=3$, the unreacted Z group or the structure in which the Z group is substituted by a reaction on the surface of a support take 0% to 100% and 100% to 0%, respectively.

When the compound represented by the formula (III-1) or (III-2) is polymerized, the polymerization may be performed by dispersing the support to which a polymerizable functional group is bonded in a mixed solution of a solvent and 1-vinyl-2-pyrrolidone or 1-vinyl-2-piperidone, or it is possible to absorb 1-vinyl-2-pyrrolidone or 1-vinyl-2-piperidone together with a small amount of solvent and a polymerization initiator in the support to which a polymerizable functional group is bonded, then remove the solvent and conduct the polymerization substantially in the absence of solvent onto the surface of the support. In the latter case, even though a certain amount of solvent remains, the polymerization solution is absorbed in the support, and polymerization can be carried out in a state in which particles of the support do not flow.

Next, the production method (2) for obtaining the stationary phase of the present invention will be explained.

The production method (2) includes a step of radical polymerization in the presence of a chain transfer agent having a terminal reactive silyl group and a step of silane coupling the obtained copolymer with the surface of the support.

The chain transfer agent having a terminal reactive silyl group, which is used in the production method (2), can be exemplified by a compound represented by a following formula (IV). The reactive silyl group in the present invention means a silyl group to which a leaving group, such as represented by Z in the following formula (IV), is bonded, and this group has a property of forming a bond in the form of Si—O-M (M is a metal atom) by condensation with respect to a metal hydroxide including silicon. The same also applies to the compounds used in other production methods below.

$$R_{3-n}Z_nSi\text{—}Y\text{-}T \qquad (IV)$$

(In the formula (IV), R are each independently an alkyl group having 1 to 5 carbon atoms, and Z is a leaving group capable of forming a bond between the silicon atom in the formula (IV) and the support. Y is an alkylene group having 1 to 30 carbon atoms, T is a chain transfer functional group, and n is an integer of 1 to 3.)

In the formula (IV), R is preferably a methyl group, an ethyl group, or a propyl group. Z is a leaving group and may be any atomic group as long as it can create a bond between the silicon atom in the formula (IV) and the oxygen constituting the silica gel.

Groups that are commonly used as leaving groups because of good balance of handleability and reactivity can be exemplified by alkoxy groups having 1 to 5 carbon atoms, and among them a methoxy group and an ethoxy group are particularly preferable, halogens (chlorine, bromine, and iodine), nitrogen-containing groups such as a dimethylamino group, a diethylamino group, a pyrrolidino group, and an imidazolyl group, an allyl group, and an isopropenyl group. Reaction conditions (including catalyst addition) can be adjusted depending on the type of the leaving group. Y is preferably an alkylene group having 1 to 10 carbon atoms. T is a chain transfer functional group. A chain transfer functional group is a functional group vigorously initiating a chain transfer reaction accompanied by migration and reinitiation reaction of a growing active species in a polymerization reaction. The presence of a chain transfer functional group makes it possible to control to a certain extent the molecular weight and terminal structure of the produced polymer. Specific preferred examples of the chain transfer functional group include a halogenated alkyl group having 1 to 12 carbon atoms, a thiol-terminated alkyl group having 1 to 12 carbon atoms, or an alkyl group having 1 to 12 carbon atoms and a disulfide group inside the group.

The halogen of the halogenated alkyl group having 1 to 12 carbon atoms can be chlorine, bromine or iodine, and the alkyl group may be an alkyl group having 1 to 3 carbon atoms.

A compound presumed to have a structure represented by the formula (V-1) or (V-2) can be obtained by radical polymerization of 1-vinyl-2-pyrrolidone or 1-vinyl-2-piperidone using a small amount of a radical generator as a catalyst in the presence of such a chain transfer agent. At this time, it is possible to control the molecular weight to some extent from the molar ratio of the chain transfer agent and the monomer. A well-known agent used for a polymerization reaction can be used as the radical generating agent, and specific examples thereof include azo compounds and peroxides.

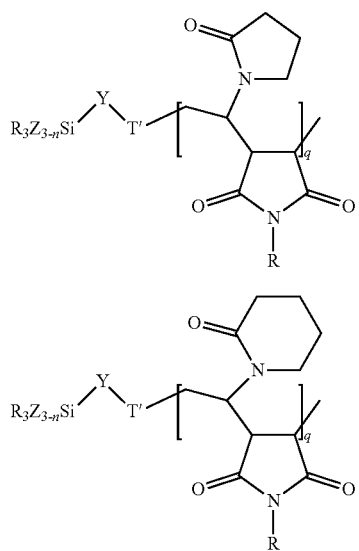

(In the formula V-1 or V-2, T' is a group derived from T of the formula (IV) and formed by a chain transfer reaction, Y, R and Z are the same as those of the formula (IV), and q is an integer from 2 to 1500.)

In the formula (V-1) or (V-2), when T is an alkyl group having 1 to 12 carbon atoms and bonded to a halogen at the end, T' is an alkylene residue having 1 to 12 carbon atoms in which the halogen in substituted, and when T is a thiol-terminated alkyl group having 1 to 12 carbon atoms or an alkyl group having 1 to 12 carbon atoms and having a disulfide group in the group, T' is a thioether.

As the support used in the method (2) for producing the stationary phase of the present invention, the same support as used in the production method (1) can be used.

A known silane coupling method can be used for coupling the compound of the formula (V-1) or (V-2) and the support by a silane coupling reaction.

It is presumed that the stationary phase obtained by bonding the compound represented by the formula (V-1) or (V-2) with the support has the following structure.

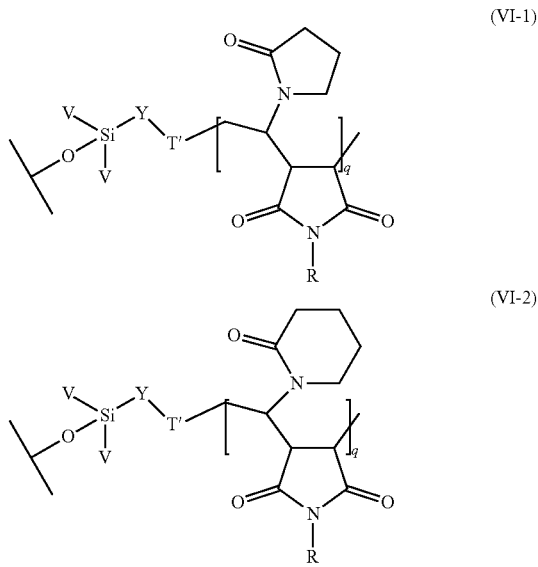

(In the formula VI-1 or VI-2, T' is a group derived from T of the formula IV and formed by a chain transfer reaction, and q is an integer from 2 to 1500. V is an ether group bonded to the surface of the support, or an unreacted Z group represented by the formula (IV), or an R group.)

Regarding V in the formula (VI-1) or (VI-2), in the compound represented by the formula (IV), when n=1, V=R. When n=2, the proportion of the R group is 50% with respect to the total number of V, and the unreacted Z group or the structure in which the Z group is substituted by a reaction on the surface of a support take 0% to 50% and 50% to 0%, respectively. When n=3, the unreacted Z group or the structure in which the Z group is substituted by a reaction on the surface of a support take 0% to 100% and 100% to 0%, respectively.

Next, the production method (3) will be described.

By introducing a stable covalent bond to form a dormant species onto the surface of the support and performing living radical polymerization from the surface, it is possible to introduce a polymer including a pyrrolidone skeleton or a piperidone skeleton and an imide skeleton in a repeating unit of the main chain onto the surface of the support such as silica gel.

In this method, a polymer including a pyrrolidone skeleton or a piperidone skeleton and an imide skeleton in a repeating unit of the main chain can be introduced to a high density onto the surface of the support such as silica gel, and a brush-like polymer orientable to a high degree can be obtained.

The following (i) to (iii) illustrate commonly used examples concerning the abovementioned feature of "introducing a stable covalent bond from a dormant species and performing living radical polymerization".

(i) A carbon-halogen bond that can be activated by a transition metal catalyst such as copper, iron, ruthenium or the like is introduced onto the surface of a support such as silica gel, and polymerization of 1-vinyl-2-pyrrolidone or 1-vinyl-2-piperidone and the compound represented by the formula (I) is caused to proceed livingly by reversibly withdrawing and pulling back halogen by a one-electron oxidation-reduction mechanism. By using this technique, it is possible to introduce a copolymer including a pyrrolidone skeleton or a piperidone skeleton and an imide skeleton in a repeating unit of the main chain at high density onto the surface of a support such as silica gel.

(ii) Where, for example, an alkoxyamine is introduced onto the surface of a support such as silica gel and the carbon-oxygen bond of the alkoxyamine is thermally dissociated to produce a carbon radical and nitroxide, polymerization of 1-vinyl-2-pyrrolidone or 1-vinyl-2-piperidone and the compound of the formula (I) proceeds and growing carbon radicals are capped reversibly and quickly with nitroxide to return to the dormant species again and the polymerization reaction is controlled. By using this technique, it is possible to introduce a copolymer including a pyrrolidone skeleton or a piperidone skeleton and an imide skeleton in a repeating unit of the main chain at high density onto the surface of a support such as silica gel.

(iii) When a thiocarbonyl compound or an iodine compound is introduced onto the surface of a support such as silica gel, reversible chain transfer by exchange reaction of radical species and dormant species between polymer ends occurs rapidly, so that all the copolymer chains have an opportunity to grow equally and the molecular weight can be controlled. By using this technique, it is possible to introduce a copolymer including a pyrrolidone skeleton or a piperidone skeleton and an imide skeleton in a repeating unit of the main chain at high density onto the surface of a support such as silica gel.

In any of the above (i) to (iii), supports the same as those used in the production methods (1) and (2) can be used, in addition to silica gel, as the support.

Next, the production method (4) will be described.

This production method includes a step of copolymerizing a silane coupling agent having a polymerizable double bond and 1-vinyl-2-pyrrolidone or 1-vinyl-2-piperidone, and a step of silane coupling the obtained polymer with the surface of a support.

The silane coupling agent having a polymerizable double bond can be exemplified by a compound having a structure represented by the formula (II). The same conditions as those described for the formula (II) can also be used for the substituents and preferred examples thereof in the formula (II).

In the production method (4) as well, the same supports as those used in the production methods (1) and (2) can be used, in addition to silica gel, as the support, and the same compounds as those used in the production method (1) or (2) can be used as 1-vinyl-2-pyrrolidone or 1-vinyl-2-piperidone and the compound represented by the formula (I).

In this production method, the molecular weight can also be controlled by using an appropriate chain transfer agent or the aforementioned living radical polymerization method in copolymer synthesis. A known silane coupling method can be used for bonding the resulting copolymer and the support by a silane coupling reaction.

Next, the method (5) will be described.

This production method includes a step of introducing a chain transfer functional group onto the surface of a support and radical polymerizing 1-vinyl-2-pyrrolidone or 1-vinyl-2-piperidone and the compound represented by the formula (I).

The support to which the chain transfer functional group is bonded, such as described hereinabove, is obtained by silane coupling of, for example, a compound represented by a following formula (VII) with silica gel when silica gel is used as a support.

$$T\text{—}Y\text{—}SiR_{3-n}Z_n \quad (VII)$$

(In the formula (VII), T is a chain transfer functional group, Y is an alkylene group having 1 to 30 carbon atoms, R are each independently an alkyl group having 1 to 5 carbon atoms, Z is a leaving group that can create a bond between the silicon atom in the formula (VII) and the support, and n is an integer of 1 to 3.)

In the formula (VII), R is preferably a methyl group, an ethyl group, or a propyl group. Z is a leaving group and may be any atomic group as long as it can create a bond between the silicon atom in the formula (VII) and oxygen constituting the silica gel when the support is silica gel. Even when the support is not silica gel, a bond with an atom constituting the support can be created.

The same compounds as those used in the production method (2) can be used for T, and the same compounds as those used in the production method (1), (2) or (4) can be used for R and Z.

The support to which a chain transfer functional group is bonded and which is used in the present invention is preferably a surface modified silica-gel obtained by silane coupling the compound represented by the formula (VII) with silica gel.

The copolymer can be immobilized on the surface of the support by using a small amount of a radical generator as a catalyst in the presence of a support onto which a chain transfer functional group has been introduced (chemically bonded) and performing radical polymerization of 1-vinyl-2-pyrrolidone or 1-vinyl-2-piperidone and the compound represented by the formula (I). In the production method (5), the same compounds as those used in the production method (1) or (2) can also be used, in addition to silica gel, as the support, and the same compounds as those used in the production method (2) can also be used as the radical generating agent.

Next, the method (6) will be described.

This production process includes a step of obtaining a copolymer by anion polymerizing an anionic initiator having a reactive silyl group at a starting terminal and 1-vinyl-2-pyrrolidone or 1-vinyl-2-piperidone, and a step of silane coupling the obtained copolymer with the surface of the support.

The anionic initiator having a reactive silyl group at the starting end, such as described hereinabove, can be obtained by, for example, silane coupling of a compound represented by a following formula (VIII) with silica gel when silica gel is used as a support.

$$R_{3-n}Z_nSi\text{—}Y\text{-}M \quad (VIII)$$

(In the formula (VIII), R are each independently an alkyl group having 1 to 5 carbon atoms, and Z is a leaving group capable of creating a bond between the silicon atom in the formula (VIII) and the support, Y is a branched or linear alkylene group having 1 to 30 carbon atoms in which arbitrary hydrogen may be substituted with a group having an aromatic ring, M is an alkali metal or an alkaline earth metal, and n is an integer of 1 to 3.)

In the formula (VIII), R is preferably a methyl group, an ethyl group or a propyl group, Y and Z are preferably the same as those in the formula (II), and M is preferably lithium, sodium, potassium or magnesium.

The group having an aromatic ring by which arbitrary hydrogen may be substituted in Y is, for example, an alkyl group having 4 to 20 carbon atoms and having 1 or 2 phenyl groups, more specifically a 1,1-diphenylhexyl group and the like.

A copolymer including a pyrrolidone skeleton or a piperidone skeleton having a terminal reactive silyl group and an imide skeleton in a repeating unit of the main chain can be synthesized by a known method in the presence of such an anionic initiator.

However, when it is difficult to directly introduce a silane coupling agent into the starting terminal by side reaction during polymerization, a copolymer can be also obtained by synthesizing a derivative having the starting terminal protected with a protecting group, deprotecting after polymerization, and quantitatively converting into a silane coupling agent. A known silane coupling method can be used for bonding the copolymer thus obtained with the support by a silane coupling reaction.

Next, the method (7) will be described.

This production method includes a step of obtaining a copolymer by anion polymerizing an anionic initiator, 1-vinyl-2-pyrrolidone or 1-vinyl-2-piperidone and a compound represented by the formula (I) and then reacting with a terminator having a reactive silyl group, and a step of silane coupling the resulting copolymer with the surface of the support. When it is difficult to directly introduce a silane coupling agent into the terminating end, a copolymer can be also obtained by using a derivative protected with a protecting group, deprotecting after termination, and quantitatively converting into a silane coupling agent.

A known method can be used for the polymerization using an anionic initiator. The terminator having a reactive silyl group can be exemplified by compounds represented by a following formula (IX).

$R_{3-n}Z_nSi—Y—Z'$ (IX)

(In the formula (IX), R are each independently an alkyl group having 1 to 5 carbon atoms, and Z is a leaving group capable of creating a bond between the silicon atom in the formula (IX) and the support, Y is a branched or linear alkylene group having 1 to 30 carbon atoms in which arbitrary hydrogen may be substituted with a group including an aromatic ring, Z' is a group that is detached by a reaction between a growing anion terminal and the terminator, and n is an integer of 1 to 3.)

Specific examples of Z are preferably those mentioned as specific examples in the formula (II).

Specific examples of Z' include a halogen (chlorine, bromine, or iodine), an alkoxy group having 1 to 5 carbon atoms, more preferably a methoxy and an ethoxy group, an alkylmercaptyl group, nitrogen-containing groups such as a dimethylamino group, a diethylamino group, a pyrrolidino group, and an imidazolyl group, an allyl group, and a 2-methyl-2-propenyl group. Reaction conditions (including catalyst addition) can be adjusted depending on the type of the leaving group.

The group having an aromatic ring by which arbitrary hydrogen may be substituted in Y is, for example, an alkyl group having 4 to 20 carbon atoms and having 1 or 2 phenyl groups, more specifically a 1,1-diphenylhexyl group and the like.

A known silane coupling method can be used for bonding the copolymer thus obtained with the support by a silane coupling reaction.

Next, the production method (8) will be described.

This production method includes a step of mixing a composition including 1-vinyl-2-pyrrolidone or 1-vinyl-2-piperidone, a compound represented by the formula (I), a crosslinking agent, and an initiator with a support, and a step of inducing a crosslinking reaction.

In this production method, an insoluble polymer is obtained by copolymerizing the monomers and the crosslinking agent. Specifically, a mixture of 1-vinyl-2-pyrrolidone or 1-vinyl-2-piperidone, a compound represented by the formula (I), a crosslinking agent such as divinylbenzene, methylenebisacrylamide, and ethylene glycol dimethacrylate at 0.01 to 1 equivalent relative to the monomers, an appropriate amount of a radical initiator and, if necessary, a solvent can be absorbed by the support and conditions can be set such that the initiator initiates the polymerization.

A well-known agent used for a general radical polymerization reaction can be used as the radical initiator, and specific examples thereof include azo compounds and peroxides.

Next, the production method (9) will be described.

The production method (9) is a modification of the method described in Non-Patent Document 2.

First, a support is dispersed in a solution of a copolymer obtained by copolymerizing 1-vinyl-2-pyrrolidone or 1-vinyl-2-piperidone and the compound represented by the formula (I), and a solvent is removed. After removing the solvent, heat is applied to the support coated with the copolymer obtained by copolymerizing 1-vinyl-2-pyrrolidone or 1-vinyl-2-piperidone with the compound represented by the formula (I). The temperature at that time can be about 50° C. to 180° C. By applying heat, the copolymer obtained by copolymerizing 1-vinyl-2-pyrrolidone or 1-vinyl-2-piperidone with the compound represented by the formula (I) is immobilized on the support. Then, a crosslinking reaction is induced by irradiation with γ-rays or an electron beam to bond the support with the copolymer obtained by copolymerizing 1-vinyl-2-pyrrolidone or 1-vinyl-2-piperidone and the compound represented by the formula (I).

The stationary phase obtained by any one of the methods (1) to (9) exhibits excellent performance as a stationary phase for supercritical fluid chromatography.

The weight average molecular weight of the polymer including a pyrrolidone skeleton or a piperidone skeleton and an imide skeleton in a repeating unit of the main chain, which is supported on the support of the stationary phase of the present invention obtained by the above operations, is preferably 1000 to 5,000,000. The weight average molecular weight of the copolymer referred to in the present invention is that of, for example, a moiety $—(CH_2—CAB)_n—$ that is a repeating unit of the main chain, in the case of the structure represented by the formulas (III-1) and (III-2) or (V-1) and (V-2).

The above range of the weight average molecular weight is preferable from the viewpoints of solubility of the copolymer in a solvent, prevention of agglomeration of particles when the copolymer is supported on a support, suppression of dissolution in a mobile phase solvent, maintenance of a binding amount when chemically bonding to a support, and the like. The optimum weight average molecular weight depends on the type of copolymer.

However, in the production method (1) of the stationary phase of the present invention, polymerization of 1-vinyl-2-pyrrolidone or 1-vinyl-2-piperidone and the compound represented by the formula (I) occurs at the same time as the immobilization on silica gel. Therefore, the weight average molecular weight is estimated from the supernatant of the polymerization solution.

In the production methods (2), (4), (6), and (7), before the copolymer including a pyrrolidone skeleton or a piperidone skeleton and an imide skeleton in the repeating unit of the main chain is bonded to the support, the weight average molecular weight of the copolymer is measured.

The weight average molecular weight can be measured by a gel permeation chromatography (GPC) method using polystyrene as a standard substance. As the GPC solvent, DMF, NMP, and THF can be appropriately used depending on the degree of dissolution of the copolymer. In the case of using DMF or NMP, 10 mM to 100 mM of lithium chloride or lithium bromide may be added to avoid an abnormal peak shape.

Among the stationary phases of the present invention, in those obtained by using the production methods (1) to (7), a copolymer including a pyrrolidone skeleton or a piperidone skeleton and an imide skeleton in a repeating unit of the main chain is covalently bonded to the surface of the support. Therefore, even when a solvent inherently capable of dissolving the copolymer or a mixed solvent including such a solvent is used as a developing solvent, the copolymer is not dissolved and functions thereof as a stationary phase are not impaired.

Among the stationary phases of the present invention, in those obtained by using the production methods (8) and (9), the copolymers are crosslinked on the support. Therefore, no dissolution occurs even when a solvent inherently capable of dissolving the copolymer or a mixed solvent including such a solvent is used as a developing solvent.

Since the specific surface area of the stationary phase of the present invention corresponds to the specific surface area of the support to be used, a support having a desired specific surface area may be selected. When the support is, for example, silica gel, the specific surface area can be adjusted by choosing the appropriate product. In general, in an embodiment in which the copolymer is supported on a support, the difference between the specific surface areas before and after supporting is not more than an error, so that the specific surface area of the stationary phase can be regarded as being the same as the specific surface area of the support to be used.

The average particle diameter of such a support which can be used in the present invention is usually 0.1 µm to 1000 µm, preferably 1 µm to 50 µm, and the average pore diameter is usually 10 Å to 10,000 Å, preferably 50 Å to 1000 Å, and more preferably 100 Å to 1000 Å. Even in this range, the smaller the pores are, the larger the surface area is and, therefore, the polymer bonding ratio increases, but the influence on adsorption by silica gel as a support tends to increase (for example, the retention of a basic sample increases and the peak tails). Therefore, it is thought that the polymer bonding ratio tends not to rise as the surface area decreases.

The specific surface area of the support is usually 5 m²/g to 1000 m²/g, preferably 10 m²/g to 500 m²/g. Generally, in the case where the copolymer is supported on a support, the difference between the specific surface areas before and after supporting is not more than an error, so that the average particle diameter of the stationary phase can be regarded as being the same as the average particle diameter of the support to be used. In other words, when the stationary phase of the present invention is in the form of particles, the average particle diameter thereof can be exemplified by 0.1 µm to 1000 µm, preferably 1 µm to 50 µm.

The average thickness [(supported amount per 1 g of the support)/(specific surface area of the support)] of the copolymer supported on the support is preferably from 0.5 nm to 5 nm. This range is preferred because the peak tends to be sharp.

Thus, in the stationary phase in which the copolymer is supported on the support, the proportion (%) of the parts by mass of the copolymer contained in 100 parts by mass of the stationary phase is preferably 1% by mass to 50% by mass, more preferably 3% by mass to 30% by mass, and more preferably 5% by mass to 20% by mass. It is preferable to set such a proportion because needlessly strong holding and broadening of the peak can be avoided while adequately demonstrating the adsorbing capacity of the copolymer.

The proportion (%) of the parts by mass of the copolymer contained in 100 parts by mass of the stationary phase can be measured by elemental analysis. Based on the measurement result of the carbon content of the support before the copolymer is supported thereon and the carbon content of the stationary phase obtained, it is assumed that the entire carbon other than carbon contained before the copolymer is supported thereon is derived from the copolymer, and the proportion of the parts by mass of the copolymer in the stationary phase is calculated by further assuming that the monomer composition in the polymer is 1:1 (molar ratio) for convenience.

When the stationary phase of the present invention is in the form of particles, where the particles are spherical, the average particle diameter refers to the diameter thereof, and where the particles are of irregular shape, the average particle diameter is represented by the diameter of the spherical particle of equal volume. The average particle diameter can be measured with a measurement device using a microscopic image, for example, Mastersizer 2000E manufactured by Malvern Instruments Ltd.

When the stationary phase of the present invention is in the form of particles, spherical particles having an aspect ratio of 2 or less, preferably 1.5 or less, are preferable. Since particles with a shape close to a true sphere are preferred, the lower limit of the aspect ratio is not particularly limited down to 1.

The aspect ratio is measured in the following manner. A sample is observed with an electron microscope or optical microscope by observation from directly above in a state in which the sample is randomly sprayed on the observation table. In any screen in which ten or more independent primary particles (not in contact with or overlapping with any other particle) are observed, a major axis and a minor axis (the length of the longest part perpendicular to the major axis) are obtained for each independent primary particle in the screen, and the ratio of both is taken as the aspect ratio of the individual particle. The aspect ratios of all the independent primary particles in the screen are arithmetically averaged, and the result is taken as the aspect ratio in the present invention. The primary particle, as referred to herein, is a particle for which the interface between the particles can be clearly observed. Normally, the observation is carried out while appropriately dispersing the particles so as to avoid overlapping of primary particles on a sample table, but accidental overlapping is difficult to avoid, and there are also bulk particles in which a plurality of primary particles are aggregated. These are excluded from observation targets.

The stationary phase of the present invention can be used as a stationary phase of high performance liquid chromatography (HPLC), supercritical fluid chromatography (SFC), and thin layer chromatography.

When the stationary phase of the present invention is used for SFC, the stationary phase has excellent separation characteristics with respect to acidic compounds and basic compounds, and also excels in separation characteristics, for example, of isomers of condensed ring aromatic compounds and aromatic compounds.

The stationary phase of the present invention can be used by packing in a column for ordinary HPLC. To pack the column, a slurry packing method can be used.

Known eluents for HPLC can be used without limitation according to the target substance to be separated.

In addition, the stationary phase of the present invention can be used by packing in a known column for supercritical fluid chromatography, such as described in, for example, Japanese Patent Application Publication No. 2006-058147.

In supercritical fluid chromatography, a fluid including a supercritical fluid and a solvent is used as a mobile phase. The supercritical fluid chromatography, as referred to herein, is a general name for chromatography using a supercritical fluid as the main mobile phase. The supercritical fluid is a substance in a state with a critical pressure or higher and a critical temperature or higher (that is, a supercritical state). Examples of substances that can be used as supercritical fluids include carbon dioxide, ammonia, sulfur dioxide, hydrogen halides, nitrous oxide, hydrogen sulfide, methane, ethane, propane, butane, ethylene, propylene, halogenated hydrocarbons, water, and the like. From the standpoint, of appropriate critical conditions, safety, cost, and the like, an embodiment in which carbon dioxide is substantially used can be mentioned. The term "supercritical fluid chromatography" is also applied to the case where a strictly supercritical state is not required, and the fluid can be used in a subcritical state. Further, a method can be also used in which the amount of ordinary liquid in the mobile phase is gradually increased from the "supercritical" conditions inclusive of a subcritical state and a transition is made to substantially liquid chromatography conditions (such a method is sometimes called integrated chromatography).

One or two or more various known solvents can be selected as the solvent according to the type of the target substance, the type of the supercritical fluid, and the like. Examples of the solvent include lower alcohols such as methanol, ethanol, 2-propanol, and the like, ketones such as acetone and the like, acetonitrile, ethyl acetate, THF, dichloromethane, chloroform, and the like. When separating basic, acidic, amphoteric compounds and polar compounds, a small amount of water, an acid, an amine base, an ammonium salt and the like may be added in order to improve the shape of the peak.

The supercritical fluid chromatography is not particularly limited as long as it is a chromatography using a fluid including the supercritical fluid and the solvent as a mobile phase.

The high-performance liquid chromatography and the supercritical fluid chromatography using the stationary phase of the present invention may be used for analysis or for fractionation.

High-performance liquid chromatography and supercritical fluid chromatography for fractionation are not particularly limited as long as the chromatography includes a step of fractionating a mobile phase which has passed through a column with a fraction collector according to the target substance separated by a column.

A well-known column suitable for both HPLC and SFC can be used as the column to be packed.

Further, the flow velocity can also be appropriately adjusted before use. For example, in the case of a column having an inner diameter of 0.46 mm, a flow velocity can be exemplified by 0.3 ml/min to 10 ml/min, preferably 1 ml/min to 6 ml/min.

In addition, the respective column temperature can be exemplified by about 0° C. to 50° C. and about 20° C. to 40° C.

In the case of application for SFC, the back pressure can be exemplified by about 120 bar to 180 bar and about 130 bar to 160 bar.

The stationary phase of the present invention can also be used as a monolith. Where the stationary phase of the present invention is to be formed into a monolith, a product can be obtained by conducting a reaction between a support which has been molded into a monolith shape in advance and to which a polymerizable functional group has been bonded, or a starting material which is for the support to be molded into a monolith shape and to which a polymerizable functional group has been bonded, 1-vinyl-2-pyrrolidone or 1-vinyl-2-piperidone, and a compound represented by the formula (I).

The high-performance liquid chromatography and supercritical fluid chromatography using the stationary phase of the present invention demonstrates excellent performance in separating compounds such as substituted position isomers of compounds having an aromatic or heteroaromatic ring.

EXAMPLES

Hereinafter, the present invention will be specifically described with reference to examples. However, the present invention is not limited to the following embodiments.

Example 1

Treatment of Silica Gel with N-methyl-N-[3-(trimethoxysilyl)propyl]-2-propenamide Preparation Example 1

A total of 200 mL of toluene, 3.91 g of trimethoxy[3-(methylamino)propyl]silane, 2.74 g of triethylamine and about 50 mg of 4-pyrrolidylpyridine were placed in a 300 mL three-necked flask, and a mixed liquid of 2.10 g of acryloyl chloride and 4 mL of toluene was added dropwise under stirring. After completion of the dropwise addition, the mixture was heated to 80° C. over about 3 h to obtain a light brown liquid in which the crystalline product (triethylamine hydrochloride) was suspended.

Meanwhile, 20.60 g of silica gel having a nominal pore size of 300 Å and a particle diameter of 5 μm which was vacuum-dried at 160° C. was placed in a 300 mL three-necked flask and an impeller was set. The light brown liquid obtained in the above reaction was poured in through a glass filter, and the solids remaining on the glass filter were rinsed with 50 mL of toluene. The flask was heated at 90° C. for 1 h and at 125° C. for 5 h in an oil bath under stirring. During this period, about 100 g of toluene was distilled from a side tube. The obtained silica gel was filtered on a 0.5 μm membrane filter, washed with 50 mL of N-methyl-2-pyrrolidone (NMP), 100 mL of methanol, and 50 mL of acetone, and then dried at 60° C. under vacuum.

The yield was 21.74 g and the weight increase rate was 6.5%.

The elemental analysis values were C: 2.65, H: 0.55, and N: 0.44 (each in %).

Copolymerization of 1-vinyl-2-pyrrolidone (VP) and N-phenylmaleimide to the Silica Gel Obtained in Preparation Example 1

A liquid obtained by nitrogen bubbling of a mixed liquid of 510 mg of 1-vinyl-2-pyrrolidone, 20.4 mg of azobisisobutyronitrile, 784 mg of N-phenylmaleimide, and 4.00 mL of NMP was poured under nitrogen atmosphere into 2.15 g of the silica gel obtained in Preparation Example 1 followed by heating at 65° C. for 2 h, at 80° C. for 1 h, and at 90° C. for 1 h. The resulting slurry was washed with 40 mL of each of NMP, THF and methanol on a glass filter, rinsed with 20 mL of acetone, and dried with a vacuum drier at 60° C. The weight of the powder obtained in Example 1 was 2.475 g and a weight gain was 15%.

It was inferred that the obtained copolymer-bound silica gel had the following structure.

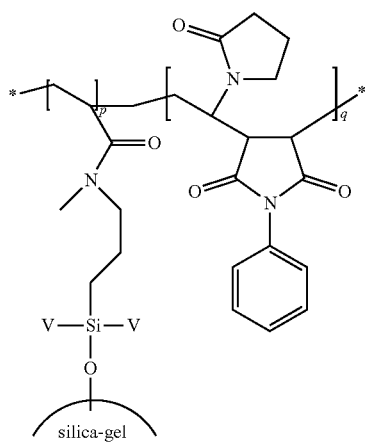

Further, the liquid phase after the polymerization reaction and the washing solution were combined and concentrated, and GPC measurement of the polymer component was carried out. The weight average molecular weight thereof was 3822. Assuming that it was an alternating copolymer, it was estimated that 1-vinyl-2-pyrrolidone and N-phenylmaleimide were together composed of about 27 monomers. Although the molecular weight of the copolymer bound to the silica gel could not be measured, it was presumed to be the same.

GPC measurement was carried out under the following conditions.

Column: TSKgel α-M+TSKgel guardcolumn α manufactured by Tosoh Corporation; mobile phase: DMF including 100 mMol/L of lithium chloride; feeding at 1.0 mL/min, temperature 40° C.; a differential refractometer detector was used for detection; the molecular weight was converted with a polystyrene standard (manufactured by Tosoh Corporation).

Example 2

A total of 201 mg of 1-vinyl-2-pyrrolidone, 321 mg of N-cyclohexylmaleimide and 8.1 mg of azobisisobutyronitrile were dissolved in 3.00 mL of acetone, and the solution was absorbed in 2.08 g of silica gel prepared in Preparation Example 1. Acetone was distilled off under reduced pressure. The remaining powder was heat treated at the same temperature and for the same time as in Example 1 under a nitrogen atmosphere and washed and dried in the same manner. The obtained powder had a weight of 2.48 g, and a weight increase was about 19%.

It was inferred that the obtained copolymer-bound silica gel had the following structure.

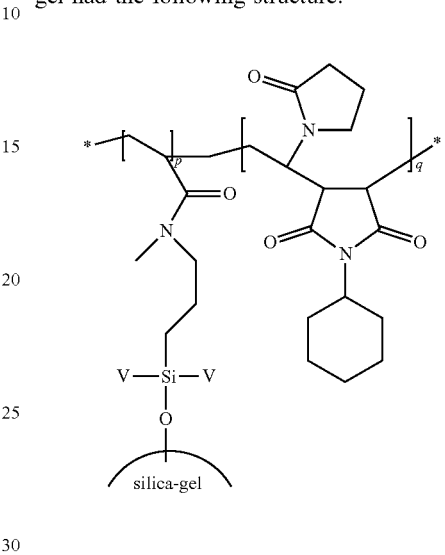

Example 3

A liquid obtained by nitrogen bubbling of a mixed liquid of 542 mg of 1-vinyl-2-pyrrolidone, 19.7 mg of azobisisobutyronitrile, 484 mg of maleimide, and 4.00 mL of cyclohexanone was poured under nitrogen atmosphere into 2.15 g of the silica gel prepared in Preparation Example 1, followed by heating at 72° C. for 4 h 20 min. A total of 10 mL of NMP was added to the obtained slurry (gelatinized due to the polymerized product) to prepare a solution, the silica gel was then filtered with a glass filter, rinsed with 30 mL of NMP, 20 mL of methanol, and 20 mL of acetone and dried in a vacuum dryer at 60° C. The obtained powder had a weight of 2.62 g and a weight gain of about 23%.

It was inferred that the obtained copolymer-bound silica gel had the following structure.

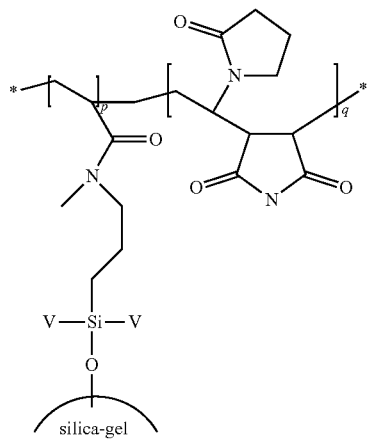

Further, the liquid phase after the polymerization reaction and the washing solution were combined, evaporated and concentrated, and GPC measurement of the polymer component was carried out. The weight average molecular weight calculated for polystyrene was 191,500. Assuming that it was an alternating copolymer, it was estimated that the combined number of monomers was 1840. Although the molecular weight of the copolymer bound to the silica gel could not be measured, it was presumed to be the same.

Comparative Example 1

A total of 984 mg of VP, 4.2 mL of NMP, and 23 mg of azobisisobutyronitrile (AIBN) were mixed, and after nitrogen bubbling, the liquid was transferred to a flask containing 2.084 g of the silica gel obtained in Preparation Example 1. The liquid was homogeneously mixed, and the flask was purged with nitrogen, then connected to a rotary evaporator, and kept for 2 h at each of 65° C., 80° C., and 90° C. while being rotated. The obtained liquid was transferred to a 5.5 μm glass filter, and washing was performed with 50 mL of NMP, 50 mL of methanol and 50 mL of acetone in several portions, followed by vacuum drying (60° C.). The yield was 2.262 g and the weight gain for the silica gel obtained in Preparation Example 1 was 8.5%. The elemental analysis values of the silica gel were C: 7.91, H: 1.37, and N: 1.48 (each in %).

It was inferred that the obtained poly(l-vinyl-2-pyrrolidone)-bound silica gel had the following structure.

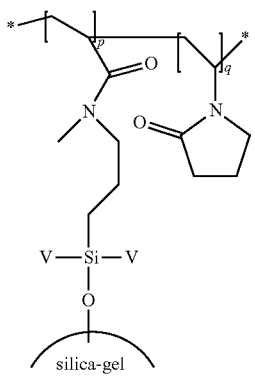

The stationary phases obtained in Examples 1 and 3 and Comparative Example 1 were packed in a 4.6 mm (diameter)×150 mm stainless steel column by wet packing using ethanol.

Figure 2:
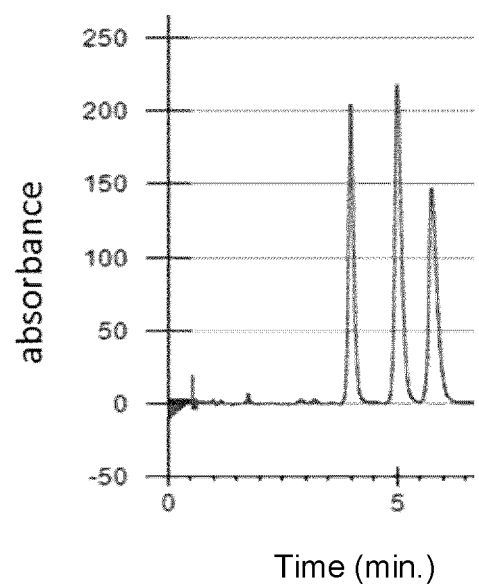
FIG. 2 is a chromatogram obtained by separating 2'-, 3'-, and 4'-hydroxyflavanone isomers by SFC using the stationary phase of Example 1.
Figure 3:
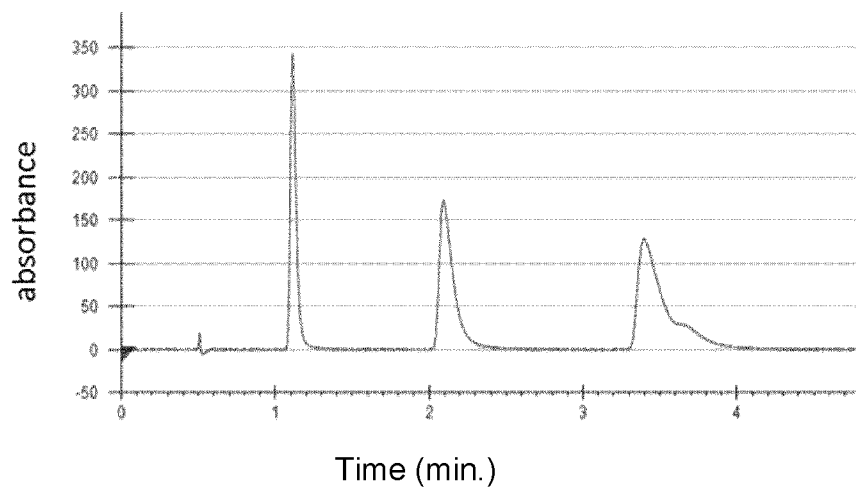
FIG. 3 is a chromatogram obtained by separating caffeine, theophylline, theobromine, and paraxanthin by SFC using the stationary phase of Example 3.

The results of SFC analysis of caffeine and three kinds of dimethylxanthine isomers (theophylline, theobromine, and paraxanthine) obtained using these columns are shown in FIG. 1: Example 1, FIG. 3: Example 3, and FIG. 5: Comparative Example 1, and the results of SFC analysis of 2'-, 3'-, and 4'-hydroxyflavanone isomers obtained using these columns are shown in FIG. 2: Example 1 and FIG. 4: Comparative Example 1.

In each case, the mobile phase was $CO_2$/methanol 9:1 (v/v), the flow velocity was 4.0 mL/min, the column temperature was 40° C., the column back pressure (BPR) was 150 bar, and the detection was performed using a UV detector (254 nm).

Figure 4:
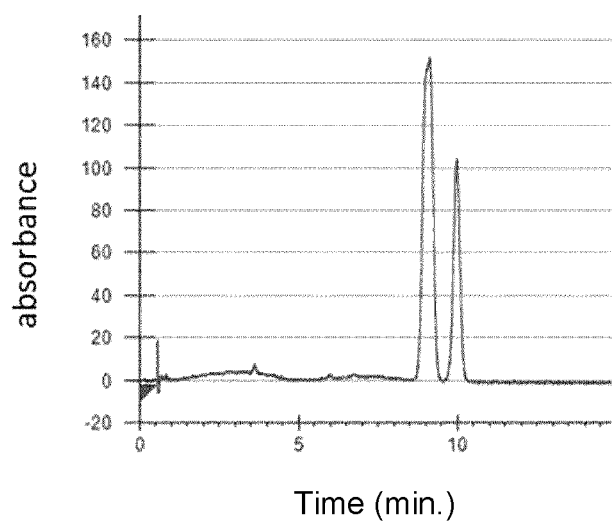
FIG. 4 is a chromatogram obtained by separating 2'-, 3'-, and 4'-hydroxyflavanone isomers by SFC using the stationary phase of Comparative Example 1.

Comparing FIG. 2 with FIG. 4, it can be seen that with the stationary phase of Comparative Example 1, separation of the 2'-, 3'-, and 4'-hydroxyflavanone isomers is insufficient.

Figure 5:
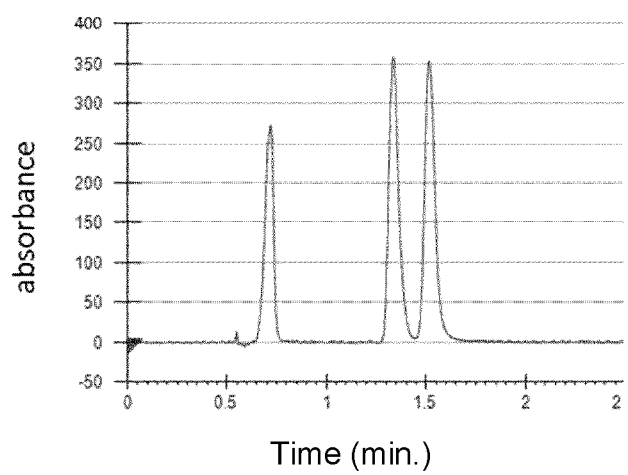
FIG. 5 is a chromatogram obtained by separating caffeine, theophylline, theobromine, and paraxanthin by SFC using the stationary phase of Comparative Example 1.

Referring to FIG. 5 (stationary phase of Comparative Example 1), it can be seen that theophylline and theobromine overlap at the second peak.

INDUSTRIAL APPLICABILITY

The stationary phase of the present invention has good separation characteristics when used for HPLC and SFC. In particular, when used as a stationary phase for SFC, it has good separation characteristics for specific compounds. Specifically, improvement in the number of column stages is expected. From this, it is clear that the stationary phase of the present invention can be expected to contribute not only to discovering and improving new separation conditions of various substances which have heretofore been difficult to separate, but also to improving the convenience of identification and analysis of separated substances.

The invention claimed is:
1. A stationary phase for chromatography, the stationary phase comprising a support supporting a polymer including a pyrrolidone skeleton or a piperidone skeleton and an imide skeleton in a repeating unit of a main chain, which has a structure represented by a following formula (III-1) or a following formula (III-2):

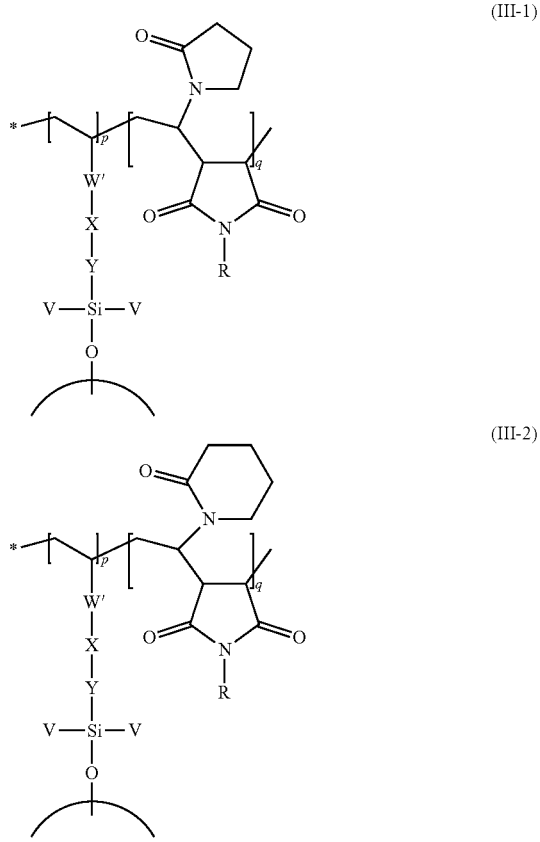

wherein W' is a single bond or an alkylene group having 1 to 10 carbon atoms which may have a branched chain, X is an amide group, an ester group, an N-alkylamide group having 1 to 3 carbon atoms, an ether group, a sulfoxide group, a sulfone group, a sulfide group, an arylene group having 6 to 20 carbon atoms or a phosphoric acid ester group, Y is an alkylene group having 1 to 30 carbon atoms, and V is an ether group, an alkoxy group having 1 to 5 carbon atoms, or an alkyl group having 1 to 3 carbon atoms which is bonded to a support surface, p is 1 to 10, q is 10 to 1500, R is a group selected from hydrogen, an alkyl group having 1 to 6 carbon atoms, a cycloalkyl group having 3 to 12 carbon atoms, a phenyl group and a hydroxyphenyl group.

2. The stationary phase for chromatography according to claim 1, which is in the form of spherical particles.

3. The stationary phase for chromatography according to claim 2, which has an average particle diameter of 0.1 μm to 1000 μm.

4. The stationary phase for chromatography according to claim 1, which is monolithic.

5. The stationary phase for chromatography according to claim 1, which is a stationary phase for supercritical fluid chromatography.

6. A method for separating a target substance, the method comprising a step of separating the target substance by using the stationary phase according to claim 1, and a mobile phase including an eluent or a supercritical fluid.

7. A method for producing a stationary phase for chromatography according to claim 1, the method comprising a step of copolymerizing 1-vinyl-2-pyrrolidone or 1-vinyl-2-piperidone and a compound represented by a following formula (I) with a support to which a polymerizable functional group is bonded:

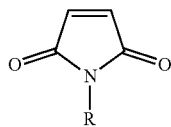
(I)

wherein R is a group selected from hydrogen, an alkyl group having 1 to 6 carbon atoms, a cycloalkyl group having 3 to 12 carbon atoms, a phenyl group and a hydroxyphenyl group.

8. The method for producing a stationary phase for chromatography according to claim 7, wherein the polymerizable functional group is a vinyl group, an allyl group, an isopropenyl group or an alkenyl group having 4 to 12 carbon atoms and having a double bond at an ω position.

9. The method for producing a stationary phase for chromatography according to claim 7, wherein the support to which the polymerizable functional group is bonded is a surface-modified silica gel obtained by silane coupling a compound represented by a following formula (II) with silica gel:

$$W-Y-SiR_{3-n}Z_n \quad (II)$$

wherein W is a vinyl group, an allyl group, an isopropenyl group or an alkenyl group having 4 to 12 carbon atoms and having a double bond at an ω position, X is an amide group, an ester group, an N-alkylamide group having 1 to 3 carbon atoms, an ether group, a sulfoxide group, a sulfone group, a sulfide group, or a phosphoric acid ester group, Y is an alkylene group having 1 to 30 carbon atoms, Z is an alkylene group having 1 to 30 carbon atoms, R are each independently an alkyl group having 1 to 5 carbon atoms, Z is a leaving group capable of forming a bond between the silicon atom in the formula (I) and the support, and n is an integer of 1 to 3.

10. The method for producing a stationary phase for chromatography according to claim 9, wherein W is a vinyl group, X is an amide group or an N-alkylamide group having 1 to 3 carbon atoms, Y is an alkylene group having 1 to 5 carbon atoms, R are independently a methyl group, an ethyl group, or a propyl group, and Z is an alkoxy group having 1 to 5 carbon atoms, a halogen, an alkylmercaptyl group having 1 to 20 carbon atoms, a dimethylamino group, a diethylamino group, a pyrrolidino group, an imidazolyl group, an allyl group or a 2-methyl-2-propenyl group.

11. A method for producing a stationary phase for chromatography according to claim 1, the method comprising: a step of obtaining a polymer by radically polymerizing 1-vinyl-2-pyrrolidone or 1-vinyl-2-piperidone and a compound represented by a formula (I) in the presence of a chain transfer agent having a terminal reactive silyl group; and a step of silane coupling the obtained polymer with a surface of a support:

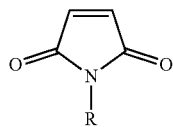
(I)

wherein R is a group selected from hydrogen, an alkyl group having 1 to 6 carbon atoms, a cycloalkyl group having 3 to 12 carbon atoms, a phenyl group and a hydroxyphenyl group.

12. The method for producing a stationary phase for chromatography according to claim 11, wherein the chain transfer agent having a terminal reactive silyl group is a compound represented by a following formula (IV):

$$R_{3-n}Z_n Si-Y-T \quad (IV)$$

wherein R are each independently an alkyl group having 1 to 5 carbon atoms, Z is a leaving group capable of forming a bond between the silicon atom in the formula (IV) and the support, Y is an alkylene group having 1 to 30 carbon atoms, T is a chain transfer functional group, and n is an integer of 1 to 3.

13. The production method according to claim 7, wherein the stationary phase for chromatography is a stationary phase for supercritical fluid chromatography.

* * * * *